Figure 1:
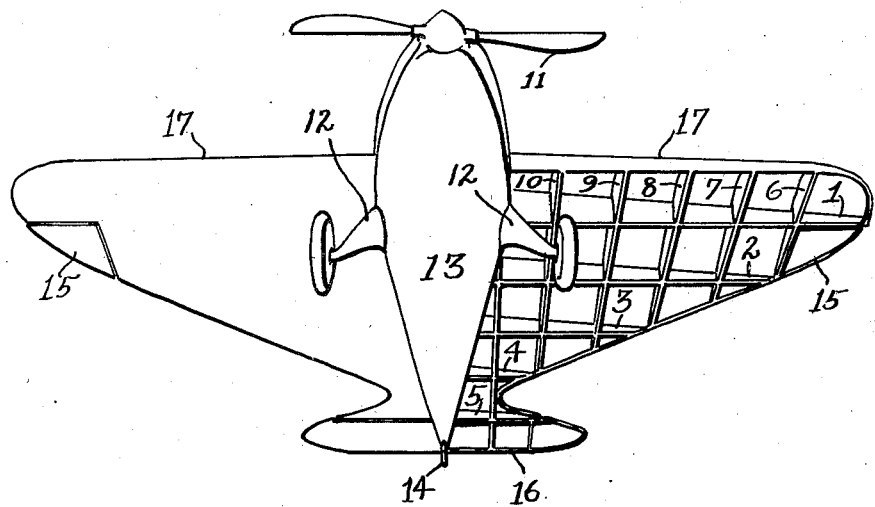

INVENTOR.
Laurence Jerome Lesh

May 24, 1932.    L. J. LESH    1,859,568
AIRPLANE
Filed Feb. 28, 1929    3 Sheets-Sheet 3
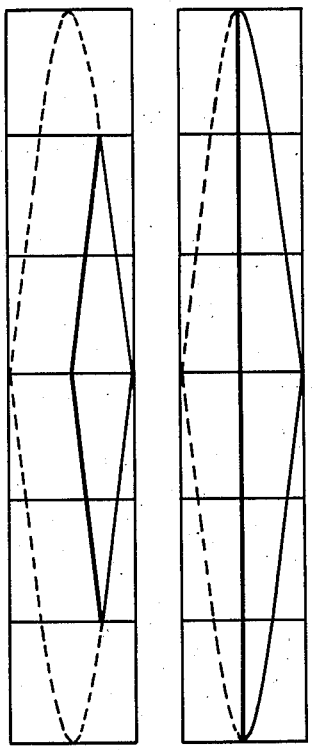
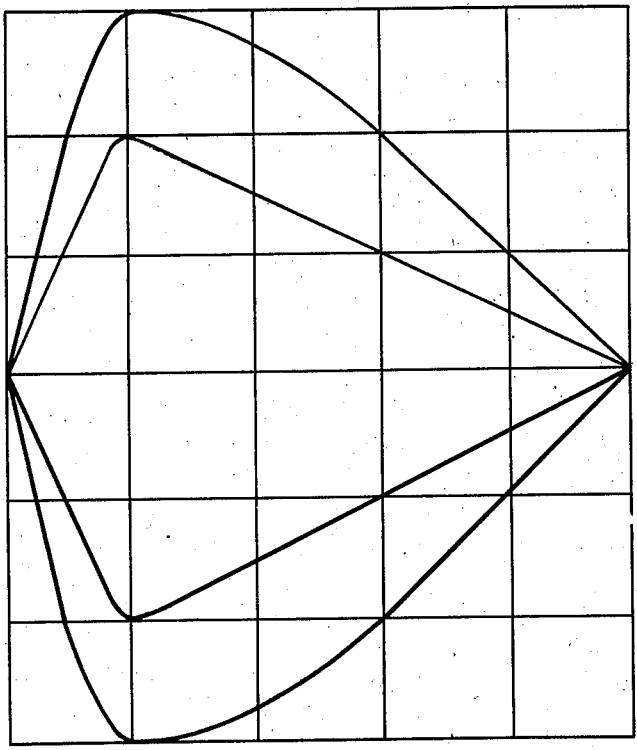
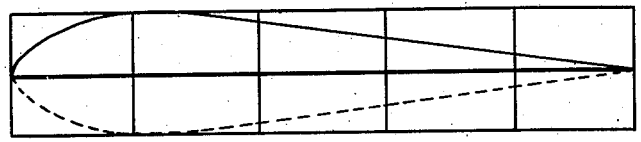
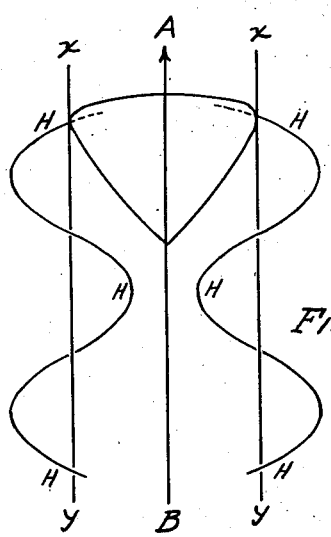
—INVENTOR—
Lawrence Jerome Lesh
BY
ATTY:

Patented May 24, 1932

1,859,568

UNITED STATES PATENT OFFICE

LAURENCE JEROME LESH, OF CHICAGO, ILLINOIS

AIRPLANE

Application filed February 28, 1929. Serial No. 343,382.

My invention relates to airplanes of the cantilever monoplane type; and the object of my improvements are, first, to reduce air resistance; second, to increase structural strength; third, to effect inherent stability; fourth, to produce an airplane having a maximum lifting capacity with minimum size and weight; fifth, to effect better longitudinal distribution of the load carried.

Before engaging in a specific analysis of my new mechanism of flight I will briefly and in a general way establish its relation to the existing art.

The most distinctive identification of an airplane from the point of novelty rests in the character of the supporting surface or aerofoil. The fuselage admits of many forms or may be omitted entirely; the alighting gear may consist of wheels, pontoons or skids; forward motion may be obtained by a motor and propeller or these organs may be omitted as in the case of a sailplane; but the aerofoil remains as the fundamental factor and a fundamental improvement in the aerofoil, as in my invention, justifies identification as a new and novel airplane type.

This invention involves a new and definite principle in aerofoil and consequently in airplane design and a thorough understanding of this principle must precede a description of the structure which embodies and expresses the principle in physical form.

The principle of similar proportional profiles, which I have discovered, when applied to aerofoil design, results in a form of supporting surface entirely different from that of existing airplanes. The keynote of this principle is found in a certain definite relationship which must exist between a given aerofoil profile or longitudinal section, selected for desired aerodynamic qualities, and the beam depth of the lateral cantilever members dictated by the factor of structural strength.

The principle of similar proportional profile as embodied in my invention is closely related to the additional feature of aerofoil continuity which dictates that the surfaces employed for control shall be aerodynamically integral with the main aerofoil and that, so far as practical design permits, the areofoil and the control surfaces shall be maintained in unbroken contact with the relative wind stream in the sense of its longitudinal or other lines of motion, frictional resistance, positive and negative pressure reactions and resultant forces.

Granting the ability of an aeronautical engineer, as one skilled in the art, to make the necessary stress analysis and to select a wing profile having the desired characteristics of lift, drift and position of the center of pressure at various angles of incidence, I will briefly outline the evolution of an aerofoil and airplane embodying the principle of similar proportional profiles and aerofoil continuity.

Structural strength will dictate that the lateral cantilever beam depth shall vary uniformly from a maximum at the base to a minimum determined by the thickness of the aerofoil edge at the outer end of the span. This simple and fundamental consideration will apply to the main cantilever, for example, which logically intersects the center of pressure, and the thickest part of the longitudinal wing profile chosen.

It is obviously desirable that every longitudinal profile or rib section of the aerofoil shall retain the same aerodynamic form and qualities and that the mechanically necessary reduction of lateral cantilever depth from base to tip dictates a proportional decrease in thickness at each longitudinal wing profile where it intersects the cantilever, and a proportional decrease in each rib chord.

The aerofoil form determined by this proportional similarity of profiles integrated with cantilever depth along the main lateral axis further dictates the length and taper of such lesser lateral cantilever beams as are required for structural strength, as well as the curve developed by the edge of the aerofoil.

In my invention ailerons or lateral control surfaces are incorporated without in any way interfering with the aerodynamic qualities of the aerofoil by providing for the hinging of a triangular portion of each wing tip, to the main cantilever beam.

Stated in practical terms, it will be seen that this principle in airplane design results in an aerofoil of substantially quadrilateral shape having two adjacent sides equal and preferably forming a right angle, and the two opposite sides equal. The rear extremity of the aerofoil is hinged and constitutes the horizontal rudder or elevator. At this point it is sometimes desirable to depart slightly from the form dictated by strict proportional profile and continuity, in order to increase the area of the control surface and such a departure is indicated in one of the accompanying drawings, although it is not absolutely necessary and for the maximum of aerodynamic efficiency sought in machines such as those intended for racing purposes, I recommend a rather strict adherence to profile proportionality, which will mean the literal hinging of the extremity of a true proportional aerofoil as shown in the second embodiment of my invention.

The fundamentals of my invention and the principle of proportional profile may perhaps be better understood when it is pointed out that the aerofoils evolved in accordance therewith are logically considered as one base segments of geometrical solids taken therefrom by a sectionalizing plane parallel to the major axis or greatest dimension. There are, of course, an infinite number of three dimensional or solid shapes, of which a limited number, when sectionalized in any plane, will result in segmental aerofoil forms adapted to any possible use in aerodynamics while a still more limited and clearly defined group of solids, invariably sectionalized in plane parallel to their major axis, fulfill the requirements of proportional profile with aerodynamic efficiency and otherwise accord with my invention.

It is an important and convincing fact that the solids from which my aerofoil may be derived by longitudinal plane partition are blunt varieties of the nearly perfect stream line of ichthyoid shapes, the directive axis of the solid of derivation being retained as the flight direction of the evolved aerofoil segment. The fundamental derivation of my invention in accordance with solids is in marked contrast and contradiction with the known art, which presents aerofoils as segments by plane section parallel to the axis, of cylinders, cones and stream line solids of non proportional profile, all directed in flight at right angles to their directive axis; or a more limited class of aerofoils usually classed as lifting fuselage or body forms of substantially uniform profile, whose flight direction accords with their major dimension or chord.

As a further study of the evolution of aerofoil shape or plan by segmentization of solids, consideration is invited to the following derivations: an aerofoil of exactly circular shape will be evolved as a segment of a sphere in any plane; an aerofoil of triangular shape or having an hyperbolic curve in part will be derived from a cone by a section parallel to its axis; a square aerofoil will be derived from a cube, by a section parallel to any side. The basic defect in aerofoils derived strictly or individually from such solids as the cube, the sphere, the cylinder and the cone, is the aerodynamic inferiority of the profile sections produced, uneconomical cantilever depth gradient, resulting in structural weakness and other faults which sharply differentiate these derivations from the flattened ichthyoid or stream line solid from which basis my invention is derived.

I have explained the development of my aerofoil as a proportional integration of a given desirable profile or longitudinal section with the structural requirements of lateral cantilever beam depth gradation. In simplest terms the following defines ideal airplane design according to my invention:

1. The shape or plan of an aerofoil is determined by the theoretical solid from which it is evolved.
2. The proportional profile of an aerofoil is determined by its shape.
3. The span gradient of an aerofoil is proportional to the longitudinal lift gradient of the profile.
4. The lateral cantilever depth gradient is proportional to the span gradient, and the profile gradient.
5. The inherent stability of an aerofoil of similar proportional profile is proportional to the ratio of mean chord to span.
6. The effective lift is proportional to and the effective resistance inversely proportional to the ratio of mean span to chord.
7. Continuity of control is determined by the relative continuity of aerofoil, air-stream and control surfaces.
8. The ratio of structural strength to weight of an aerofoil is proportional to the ratio of the mean thickness to the chord of its proportional profile.

I attain my objects by the mechanism illustrated in the accompanying drawings which illustrate two embodiments of the invention, in which—

Figure 2:
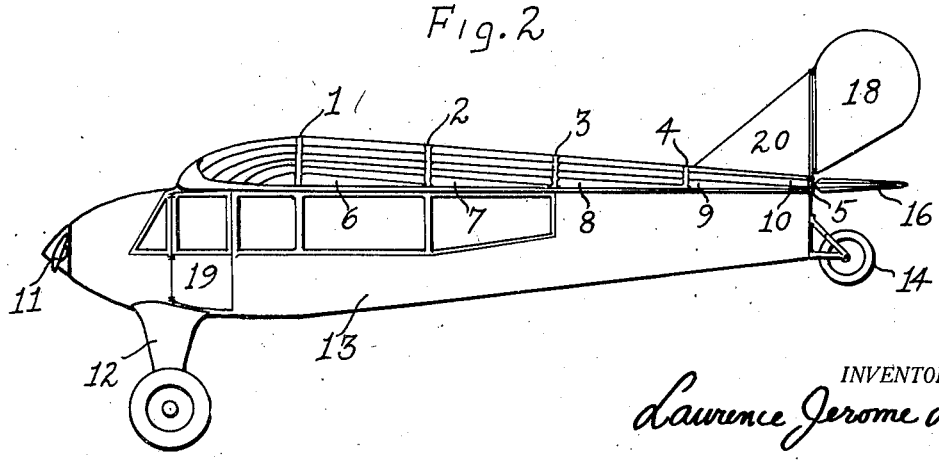

Figure 1 is a perspective view of an airplane of the conventional fuselage or body type viewed from in front and below; with the covering removed from one wing to show details; while Figure 2 presents a side elevation of the same embodiment with the covering also removed from the wing.

Figure 3:
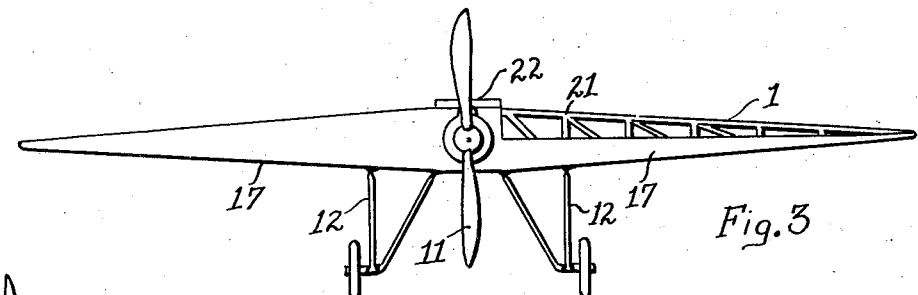
Figure 4:
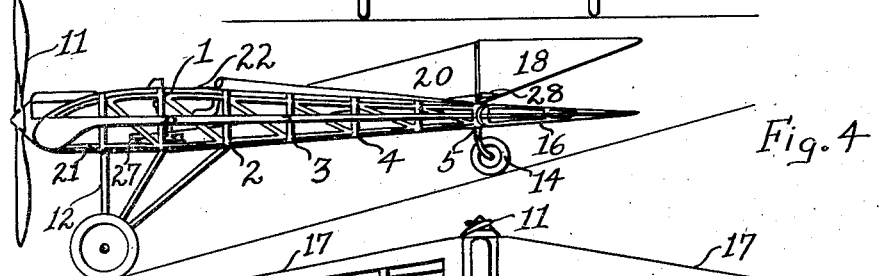
Figure 5:
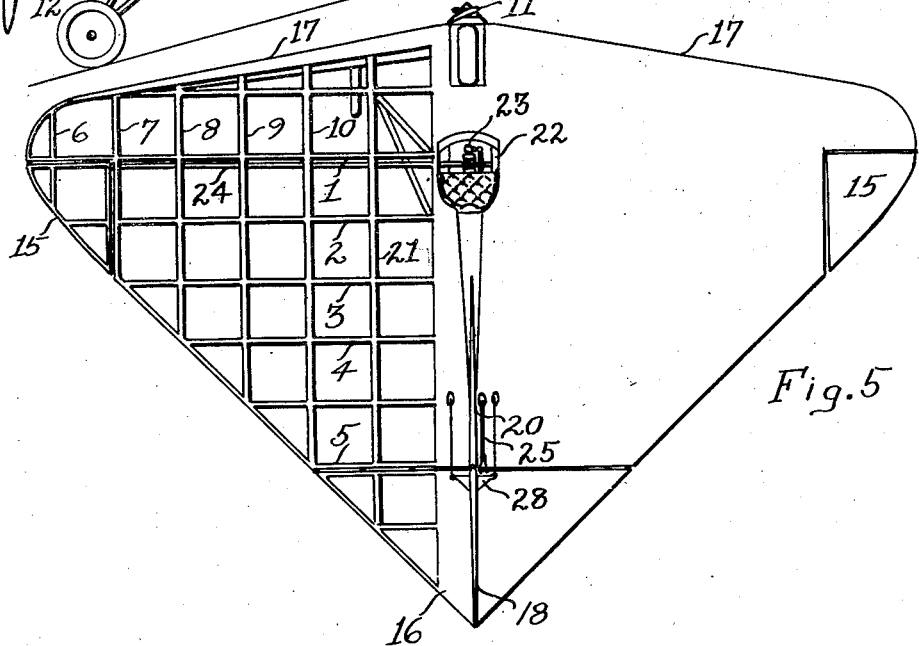

Figure 3 illustrates in front elevation an embodiment of the invention showing how the fuselage may be eliminated and the horizontal control surface held in rigid conformity with the principles of proportional profile and surface continuity. In Figure 3 the covering is removed from one wing and all but the main lateral cantilever removed in order to indicate clearly one of the suitable methods of constructing a trussed member of this type. Figure 4 presents a side elevation of the same type of airplane embodying my invention, in which the wing covering and all but one of the rib sections or profiles are omitted in order to show clearly a typical trussed longitudinal wing section or rib. Figure 5 is a plan view from above of the non-fuselage embodiment of my invention showing the disposition of lateral cantilevers and longitudinal ribs comprising all parts of a structure in accordance with my conception. Figures 6, 7, 8, 9, and 10 show graphically the design method employed in carrying out my invention, and Figure 11 indicates the character of the air circulation developed by my aerofoil in flight.

Similar numerals refer to similar parts in both embodiments of the invention as shown in the drawings.

Referring now to Figure 1, 13 is a conventional airplane fuselage rigidly attached to the cantilever wing structure 17. The covering is removed top and bottom from one side of the aerofoil revealing lateral cantilever members 1, 2, 3, 4, 5 and longitudinal ribs or wing sections 6, 7, 8, 9, 10. These cantilevers and ribs are shown in this embodiment as solid beams which may be of wood or metal according to known practice or of channel or hollow construction at the option of the builder. The cantilevers and ribs are fabricated into a rigid structure by means of bolts, rivets or the process of welding joints dependent on the material employed and the prevailing art.

The aerofoil constructon as represented in Figure 1 shows clearly the result of proportional profile as applied to airplane design in accordance with my invention. Cantilever beams 1, 2, 3, 4, etc., are seen to be of the same shape but of successively smaller size as dictated by their relation to the correspondingly proportionated ribs 6, 7, 8, 9 and 10.

Ailerons 15 in Figure 1 consist of hinged portions of the main aerofoil of substantially triangular shape hinged to cantilever 1, with freedom of angular movement about this lateral axis and operation by means of control wires or rods and levers actuated by the aviator in the conventional manner to maintain the airplane in the proper balance about the axis of its flight direction.

The rear extreme portion of the aerofoil, 16, is hinged to the rearmost lateral cantilever 5 and functions as a horizontal rudder or elevator to regulate the vertical angle of flight. Surface 16 is manually controlled by the aviator by means of wires or control rods in the conventional manner well known to the art.

Other parts of the airplane as shown in this embodiment of my invention, such as 11, the propeller, 12, the landing gear and 14, the rear wheel, for which a skid is sometimes substituted are subject to wide variation in design or omission without affecting substantially the novel status of my conception.

Figure 2 is a side elevation of the same embodiment depicted in Figure 1, the wing covering being removed as previously, exposing the longitudinal wing profiles or rib sections 6, 7, 8, 9 and 10. The vertical organs of flight direction, 20 and 18 are revealed in this view, 20 being mounted rigidly on the main aerofoil as shown, while the rudder 18 is hinged about a vertical axis at the rear edge of 20 and operated by the aviator in the well known manner to control the direction of flight in the plan of the aerofoil. The fuselage 13 in Figure 2 is of the conventional closed cabin type, a door 19 providing access to the interior.

Figure 3 depicts a front view of another preferred embodiment of my invention in which the conventional fuselage is eliminated and the horizontal rudder or elevator surface 16, is made to conform strictly to profile proportionality and surface continuity to attain with the least possible compromise, the full aerodynamic benefits of my invention in an airplane designed essentially for speed. The aerofoil structure comprises a plurality of lateral contilevers, the main member being exposed by removal of the covering fabric of the aerofoil in Figure 3 and the lesser cantilevers being omitted in this view for the sake of clearness although their complete assembly is revealed in the plan view designated as Figure 5.

The main cantilever 1, as shown in Figure 3 is represented as a truss, the vertical members thereof being at the intersection of a plurality of longitudinal wing sections such as 6, 7, 8, 9, 10 and 21 of Figure 5. The ribs or wing sections are shown as of similar truss construction, one of these ribs, 21 being shown in Figure 4, a side elevation of the airplane in which view the associated rib sections are omitted in order to more clearly reveal the structure and profile of the typical section 21. The remaining sections 6, 7, 8, 9 and 10 are, as shown in the plan view Figure 5, of similar and proportionate structure and profile and the same may be said of the inferior cantilevers 2, 3, 4, 5, in the same figure, which are proportional in shape and structure to the major cantilever 1, differing only in size and in the number of rib sections which they individually intersect.

The various lateral cantilevers and longitudinal rib sections are composed as a rigid structure by welding, bolts or other fastenings at their joints of intersection depending on the materials of construction and the manner of assembly chosen in conformity with well known methods of fabricating such a structure.

Ailerons 15, elevator 16, rudder 18, propeller 11, alighting gear 12 and rear wheel 14, serve the same purposes as described more fully in the embodiment represented in Figures 1 and 2 admitting of considerable variation in form without departing from the spirit of the invention which is mainly concerned with the aerofoil itself.

The exact manner of operating the ailerons and vertical and horizontal rudders, constitues a matter of no direct importance to my invention. In order to establish the broad conventionality of the means employed, I show in Figures 3, 4 and 5, the well known control stick 23, hinged at its lower end and connected with suitable gears or cranks so that a lateral or sidewise motion of the top of the stick will transmit a torsional motion to bar 24 in one direction and a torsional motion to a similar bar in the other side of the aerofoil, in opposite directions. These torsional bars are, directly or by cranks, connected to ailerons 15 and serve to move these ailerons equally or differentially in opposite directions about the axis upon which they are hinged to the main aerofoil. A motion of the control stick to one side is usually arranged to turn the aileron on the same side to a negative angle while depressing or placing the opposite aileron at a positive angle thereby elevating that side of the airplane when in flight.

The control stick is arranged to swing backwards and forwards as well as and simultaneously if required, with its lateral movement. Suitable crank or gear means is provided so that pulling the stick backward toward the aviator pulls the control rod 20 and elevates or gives a negative angle to the elevator 16 by a suitable crank attached thereto, while pushing the stick forward depresses the elevator and directs the airplane on a downward course in accord with the usual practice.

Turning of the vertical rudder of direction 18 is accomplished usually by means of a rudder bar 28, attached rigidly thereto from the ends of which wires are connected directly to the foot rudder bar 27, placed conveniently in front of the aviator so that pushing with the left foot results in swinging the rudder to the left and directing the airplane in the same direction while pushing with the right foot directs the airplane towards the right. Foot pedals connected together and to the rudder so as to move in opposite directions are sometimes substituted for the rudder foot bar, the necessary control motion being similar in both cases.

One of the advantages of my invention made possible by the deep but efficient center wing section is the elimination of the conventional body or fuselage as shown in Figures 3, 4 and 5 in which embodiment the aviator and passengers are accommodated in an opening or cockpit 22 provided in the aerofoil itself while the motor with propeller 11 attached, is mounted directly in the front edge of the aerofoil structure.

In Figures 6, 7, 8, 9 and 10 I present the design analysis and sectionalizing method to be adopted in evolving an aerofoil in accordance with my invention as previously described and as embodied substantially in two complete airplane forms.

Figure 6 shows the plan shape of the flattened ichthyoid and a segment to be derived therefrom by a shallow V-shaped section taken through the longitudinal axis as shown by the full lines as in Figure 8, a front elevation, where it is seen that the intersection of the two planes of the sectionalizing V corresponds with the longitudinal axis of the ichthyoid of derivation. Figure 7 presents an alternate segment evolved as exactly half of the full ichthyoid by a section taken in the plane of both the longitudinal and lateral axes. In both Figures 7 and 8 the dotted lines show the portion of the solid of derivation remaining after the segments represented in full line have been derived.

Figures 9 and 10 present in side elevation the same respective segments shown in front elevation in Figures 7 and 8, the outline of the full solid of derivation being completed by dotted lines.

In order to clearly show how the proportional profiles are employed or derived, these analytic figures are based on a convenient cubical unit the solid of derivation being five units in length, 6 units wide and one unit thick, as shown. All profiles intersecting the lateral axis are similar to the major profiles of Figures 9 and 10 respectively and are substantially proportional to the lateral cantilever depth gradient and in correspondence with all other basic requirements of my invention.

Figure 11 indicates the important essentials of cyclic motion of the air as related to translation of my aerofoil through this medium. The aerofoil is drawn in plan view as seen from above and moving toward A in the direction BA. HHH present the relative path of particular air particles whose motion originates under the aerofoil and traverses substantially helical relative paths about the axes XY as the resultant of an initial downward and lateral thrust succeeded by an attraction upward and toward the axis of flight as a result of suction, establishing finally a double vortex in the wake of the aerofoil in flight.

Since the reaction on the aerofoil is equal to and in opposite direction to the cyclic motion of the air as illustrated in the two filaments, whose axes are substantially parallel to the line of flight, the dynamic theory explaining the longitudinal stability of my airplane may be readily derived and contrasted with the inherent longitudinal instability of an aerofoil of the usual high aspect ratio which generates a cycloid principally about a lateral axis and must depend on auxiliary surfaces located in a zone of cyclic disturbance for fore and aft stability and control.

Aerodynamic science has long recognized the desirability of certain pterygoid and semi-ichthyoid longitudinal aerofoil sections or profiles but my invention, in its provision of a scientifically developed plan shape promotes an outward lateral thrust of the air particles promoting wake cycloids having axes parallel to the line of flight; in addition to a similar proportionality of profiles and cantilevers, thereby completing its accordance with aerodynamic and structural requirements.

I have described my invention as embodied in only two airplane forms as illustrative of its application to the art and while aware of the fact that other adaptations may be made without departing from the spirit and intent of the conception as disclosed, what I claim is:

1. An airfoil having a semi-span gradient equal to its chord gradient and a lateral cantilever depth gradient equal to its profile gradient posterior to the lateral axis.

2. An airfoil having equally tapered lateral and longitudinal airfoil sections extending at right angles from any point to the rear of the lateral or Y axis.

3. An airfoil in which the vertical cross-section extending laterally outward from any point located to the rear of the Y axis and the vertical cross-section extending longitudinally rearward from the same point are equally tapered and have the same contour.

LAURENCE JEROME LESH.